US012111613B2

(12) United States Patent
Saeki et al.

(10) Patent No.: US 12,111,613 B2
(45) Date of Patent: Oct. 8, 2024

(54) PREPARING METHOD OF ELECTROSTATIC CHARGE IMAGE DEVELOPING TONER AND ELECTROSTATIC CHARGE IMAGE DEVELOPING TONER

(71) Applicant: FUJIFILM Business Innovation Corp., Tokyo (JP)

(72) Inventors: Yuta Saeki, Kanagawa (JP); Atsushi Sugawara, Kanagawa (JP); Daisuke Noguchi, Kanagawa (JP); Kazuhiko Nakamura, Kanagawa (JP); Hiroshi Nakazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 369 days.

(21) Appl. No.: 17/373,915

(22) Filed: Jul. 13, 2021

(65) Prior Publication Data

US 2022/0299900 A1 Sep. 22, 2022

(30) Foreign Application Priority Data

Mar. 22, 2021 (JP) ................................ 2021-047973

(51) Int. Cl.
*G03G 9/08* (2006.01)
*G03G 9/087* (2006.01)

(52) U.S. Cl.
CPC ........... *G03G 9/0823* (2013.01); *G03G 9/087* (2013.01)

(58) Field of Classification Search
CPC ........... G03G 9/08755; G03G 9/08782; G03G 9/09733; G03G 9/09741; G03G 9/09758
See application file for complete search history.

(56) References Cited

FOREIGN PATENT DOCUMENTS

JP 2008-304874 A 12/2008
JP 2012-208219 * 10/2012 ............... G03G 9/08

OTHER PUBLICATIONS

Translation of JP 2012-208219.*

* cited by examiner

*Primary Examiner* — Peter L Vajda
(74) *Attorney, Agent, or Firm* — Sughrue Mion, PLLC

(57) ABSTRACT

A preparing method of an electrostatic charge image developing toner includes: aggregating at least binder resin particles and release agent particles contained in a dispersion to form aggregated particles; heating and coalescing the aggregated particles to form coalesced particles; and filtering and cleaning the coalesced particles to obtain toner particles, in which before the aggregating or during the aggregating, a polymer dispersant is added to the dispersion in an amount of 0.01% by weight or more and 1.3% by weight or less with respect to a total weight of the obtained toner particles.

13 Claims, 2 Drawing Sheets

PREPARING METHOD OF ELECTROSTATIC CHARGE IMAGE DEVELOPING TONER AND ELECTROSTATIC CHARGE IMAGE DEVELOPING TONER

CROSS-REFERENCE TO RELATED APPLICATIONS

This application is based on and claims priority under 35 USC 119 from Japanese Patent Application No. 2021-047973 filed on Mar. 22, 2021.

BACKGROUND

(i) Technical Field

The disclosure relates to a preparing method of an electrostatic charge image developing toner and an electrostatic charge image developing toner.

(ii) Related Art

A method for visualizing image information, such as electrophotography, has been currently used in various fields. In electrophotography, an electrostatic charge image is formed as image information on the surface of an image holding member by charging and electrostatic charge image formation. Then, a toner image is formed on the surface of the image holding member with a developer containing toner, and the toner image is transferred onto a recording medium, and then the toner image is fixed on the recording medium. Through these steps, the image information is visualized as an image.

For example, JP2008-304874A describes a preparing method of an electrostatic charge image developing toner including, at least: an aggregating step of aggregating particles while stirring a dispersion containing polymer primary particles and coloring agent particles to obtain a particle aggregate; and an aging step of coalescing the particle aggregate at a temperature higher than a glass transition temperature of the polymer primary particles, in which in the aging step, the temperature is raised while adding a dispersant.

SUMMARY

Aspects of non-limiting embodiments of the present disclosure relate to a preparing method of an electrostatic charge image developing toner which has an excellent charging property in a high-temperature and high-humidity environment (28° C., 85% RH) and is less likely to generate a coarse powder during preparing, compared to a case where a polymer dispersant is not added to a dispersion or is added to a dispersion in the amount of less than 0.01% by weight or more than 1.3% by weight with respect to a total weight of the obtained toner particles in an aggregating step and during the aggregating step.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a preparing method of an electrostatic charge image developing toner includes: aggregating at least binder resin particles and release agent particles contained in a dispersion to form aggregated particles; heating and coalescing the aggregated particles to form coalesced particles; and filtering and cleaning the coalesced particles to obtain toner particles, in which before the aggregating or during the aggregating, a polymer dispersant is added to the dispersion in an amount of 0.01% by weight or more and 1.3% by weight or less with respect to a total weight of the obtained toner particles.

BRIEF DESCRIPTION OF THE DRAWINGS

Exemplary embodiments of the present invention will be described in detail based on the following figures, wherein.

DETAILED DESCRIPTION

Figure 1:
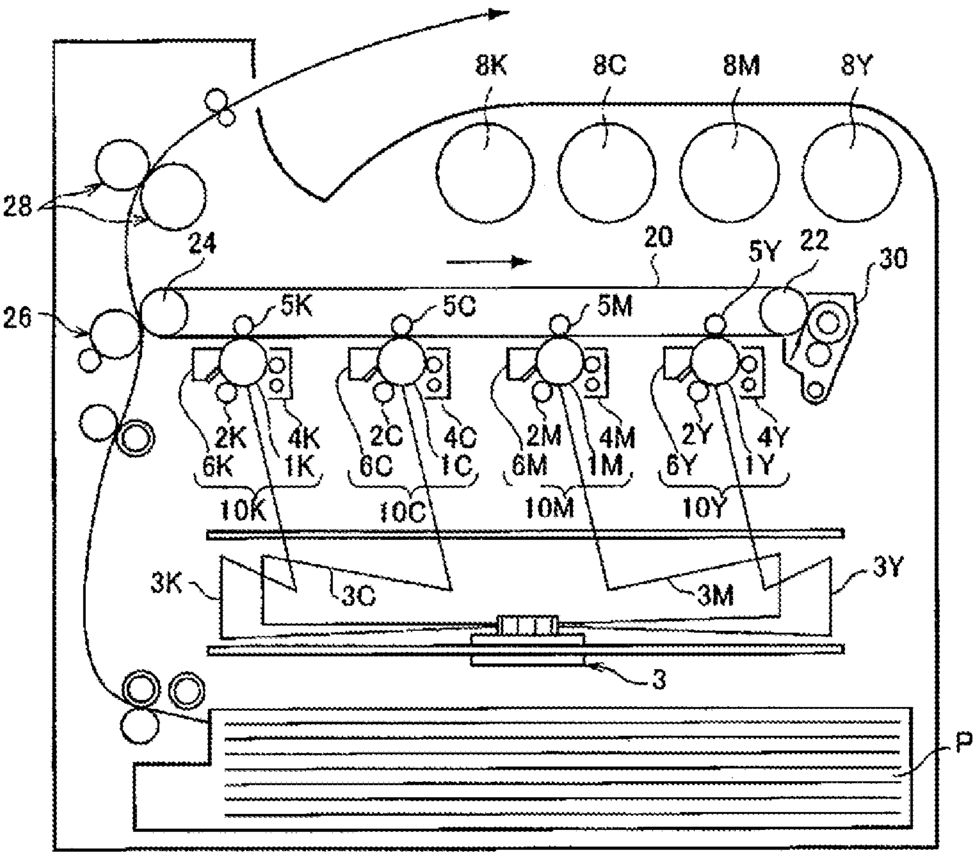
FIG. 1 is a schematic configuration diagram illustrating an example of an image forming apparatus according to an exemplary embodiment.

Hereinafter, exemplary embodiments which are examples of the present disclosure will be described in detail.

In a numerical range described in steps, an upper limit or a lower limit described in a certain numerical range may be replaced with an upper limit or a lower limit of another numerical range described in steps.

Further, in the numerical range, the upper limit or the lower limit described in a certain numerical range may be replaced with the value described in examples.

In a case where there are plural substances corresponding to each component in the composition, the amount of each component in a composition means a total amount of the plural substances present in the composition, unless otherwise specified.

The term “step” includes not only an independent step but also other steps as long as the intended purpose of the step is achieved even if it is not able to be clearly distinguished from other steps.

<Preparing Method of Electrostatic Charge Image Developing Toner>

A preparing method of an electrostatic charge image developing toner according to an exemplary embodiment includes an aggregating step of aggregating at least binder resin particles and release agent particles contained in a dispersion to form aggregated particles; a coalescing step of heating and coalescing the aggregated particles to form coalesced particles; and a cleaning step of filtering and cleaning the coalesced particles to obtain toner particles, in which before the aggregating step or during the aggregating step, a polymer dispersant is added to the dispersion in an amount of 0.01% by weight or more and 1.3% by weight or less with respect to a total weight of the obtained toner particles.

Further, an electrostatic charge image developing toner according to the exemplary embodiment is a toner prepared by the preparing method of an electrostatic charge image developing toner according to the exemplary embodiment.

Examples of a method of efficiently preparing a toner include a wet production method such as an emulsion polymerization aggregation method and a suspension polymerization method. Among these, the emulsion polymerization aggregation method is a particularly excellent method for narrowing a particle size distribution of the toner. In the emulsion polymerization aggregation method, it is known that a dispersant is added in order to prevent a coarse powder from being generated during aggregation or coalescence. For example, JP2008-304874A discloses a method of preventing a coarse powder from being generated (the coarse powder generated in a coalescing step) by adding a dispersant in the coalescing step, without affecting a toner quality, but a charging property may deteriorate.

In the preparing method of an electrostatic charge image developing toner according to the exemplary embodiment, it is presumed that before and during the aggregating step, when the polymer dispersant is added to the dispersion in the amount of 0.01% by weight or more and 1.3% by weight or less with respect to the total weight of the obtained toner particles, viscosity of the dispersion may be lowered during the aggregating, stirring efficiency may be improved, and the coarse powder may be prevented from being generated. Further, it is presumed that when setting the additive amount of the polymer dispersant within the range, an effect of suppressing the coarse powder from being generated may be sufficiently obtained, and in the cleaning step, the polymer dispersant contained in the obtained toner particles may be sufficiently removed, and thereby the charging property may be prevented from deteriorating due to a residual polymer dispersant in a high-temperature and high-humidity environment (28° C. and 85% RH).

The preparing method of an electrostatic charge image developing toner according to the exemplary embodiment is a method for preparing toner particles by an aggregation and coalescence method.

Hereinafter, the respective steps will be described in detail.

<Aggregating Step>

The preparing method of an electrostatic charge image developing toner according to an exemplary embodiment includes the aggregating step of aggregating at least binder resin particles and release agent particles contained in a dispersion to form aggregated particles, in which before the aggregating step or during the aggregating step, the polymer dispersant is added to the dispersion in the amount of 0.01% by weight or more and 1.3% by weight or less with respect to a total weight of the obtained toner particles.

The polymer dispersant is a compound having a weight average molecular weight Mw of 1,000 or more.

The polymer dispersant is preferably a water-soluble polymer dispersant, from the viewpoints of a coarse powder prevention property and a charging property in a high-temperature and high-humidity environment.

In the exemplary embodiment, "water-soluble" means that a target substance dissolves in water in an amount of 0.5% by weight or more, preferably 1% by weight or more at 25° C.

Further, the polymer dispersant preferably has an acid group or at least a salt structure thereof, and more preferably has a sulfonic acid group or a carboxyl group, or at least a salt structure thereof, and particularly preferably has a sulfonic acid group or a salt structure thereof, from the viewpoints of a coarse powder prevention property and a charging property in a high-temperature and high-humidity environment.

Furthermore, the polymer dispersant preferably has a salt structure, from the viewpoints of a coarse powder prevention property and a charging property in a high-temperature and high-humidity environment.

Examples of the salt structure preferably include an alkali metal salt structure or an ammonium salt structure, and more preferably include the alkali metal salt structure.

Examples of the polymer dispersant include a sulfonic acid compound-formalin condensate, an α-olefin-maleic acid copolymer, a styrene-maleic acid copolymer, a poly (meth)acrylic acid, carboxymethyl cellulose, polystyrene sulfonic acid, a (meth)acrylamide-(eth)acrylic acid copolymer, alginic acid, a styrene-styrene sulfonic acid copolymer, a styrene-(meth)acrylic acid copolymer, a vinyl naphthalene-maleic acid copolymer, a vinyl naphthalene-(meth) acrylic acid copolymer, a vinyl naphthalene-acrylic acid copolymer, a (meth)acrylic acid alkyl ester-(meth)acrylic acid copolymer, and a styrene-(meth)acrylic acid alkyl ester-(meth)acrylic acid copolymer, or a salt thereof.

Among these, the polymer dispersant is preferably at least one compound selected from the group consisting of a formalin condensate sulfonate, a salt of an α-olefin-maleic acid copolymer, and a salt of a styrene-maleic acid copolymer, from the viewpoints of a coarse powder prevention property and a charging property in a high-temperature and high-humidity environment, more preferably the formalin condensate sulfonate, and particularly preferably a formalin condensate sulfonic acid alkali metal salt.

Further, the formalin condensate sulfonate is preferably a salt of an aromatic sulfonic acid compound-formalin condensate, more preferably a naphthalene sulfonic acid formalin condensate, and particularly preferably a naphthalene sulfonic acid alkali metal salt formalin condensate.

A total additive amount of the polymer dispersant added to the dispersion before the aggregating step or during the aggregating step is 0.01% by weight or more and 1.3% by weight or less with respect to the total weight of the obtained toner particles, and from the viewpoints of a coarse powder prevention property and a charging property in a high-temperature and high-humidity environment, preferably 0.03% by weight or more and 1.3% by weight or less, more preferably 0.05% by weight or more and 1.0% by weight or less, and particularly preferably 0.1% by weight or more and 0.8% by weight or less.

The addition of the polymer dispersant in the preparing method of an electrostatic charge image developing toner according to the exemplary embodiment may be performed before the aggregating step, that is, even before the aggregating agent is added and also during the aggregating step, that is, the aggregated particles are formed after adding the aggregating agent, but is preferably performed before the aggregating step, that is, before the aggregating agent is added, from the viewpoint of a coarse powder prevention property.

Further, before the aggregating step or during the aggregating step, the polymer dispersant s preferably added as an aqueous solution of the polymer dispersant, from the viewpoints of a coarse powder prevention property and a charging property in a high-temperature and high-humidity environment, the polymer dispersant is more preferably added as an aqueous solution of 1% by weight or more and 40% by weight or less of the polymer dispersant, and the polymer dispersant is particularly preferably added as an aqueous solution of 5% by weight or more and 30% by weight or less of the polymer dispersant.

The dispersion in the aggregating step is preferably an aqueous dispersion, and more preferably a water dispersion.

Examples of a dispersion medium used for the dispersion in the aggregating step include an aqueous medium.

Examples of the aqueous medium include water such as distilled water and ion exchanged water, and alcohols. These may be used alone, or two or more thereof may be used in combination.

Further, the dispersion in the aggregating step favorably contains a surfactant other than the polymer dispersant.

Examples of the surfactant include anionic surfactants such as sulfate ester, sulfonate, phosphoric acid ester, and soap anionic surfactants; cationic surfactants such as amine salt and quaternary ammonium salt cationic surfactants; and nonionic surfactants such as polyethylene glycol, alkyl phenol ethylene oxide adduct, and polyhydric alcohol non-ionic surfactants. Among them, anionic surfactants and cationic surfactants are particularly preferable, Nonionic surfactants may be used in combination with anionic surfactants or cationic surfactants.

The surfactants may be used alone, or two or more thereof may be used in combination.

A volume average particle diameter of the binder resin particles before the aggregating, which are dispersed in the dispersion is, for example, preferably 0.01 μm or more and 1 μm or less, more preferably 0.04 μm or more and 0.8 μm or less, and even more preferably 0.06 μm or more and 0.6 μm or less.

A volume average particle diameter of the release agent particles before the aggregating, which are dispersed in the dispersion is, for example, preferably 0.01 μm or more and 1 μm or less, more preferably 0.08 μm or more and 0.8 μm or less, and even more preferably 0.1 μm or more and 0.6 μm or less.

Regarding the volume average particle diameters of the resin particles and the release agent particles, a cumulative distribution by volume is drawn from the side of the smallest diameter with respect to particle diameter ranges (channels) separated using the particle size distribution obtained by the measurement of a laser diffraction-type particle size distribution measuring device (for example, manufactured by Horiba, Ltd., LA-700), and a particle diameter when the cumulative percentage becomes 50% with respect to the entire particles is measured as a volume average particle diameter D50v. The volume average particle diameter of the particles in other dispersions is also measured in the same manner.

Further, the dispersion may further contain coloring agent particles and the like used for the toner particles.

A preferred volume average particle diameter of the coloring agent particles is the same as the preferred volume average particle diameter of the binder resin particles.

In the aggregating step, a solid content concentration of the dispersion is preferably 5% by weight or higher and 30% by weight or lower, more preferably 8% by weight or higher and 25% by weight or lower, and particularly preferably 11% by weight or higher and 20% by weight or lower, from the viewpoints of dispersibility of the binder resin particles and the release agent particles, a coarse powder prevention property and a charging property in a high-temperature and high-humidity environment.

In the aggregating step, for example, the aggregating agent is added to the dispersion and a pH of the mixed dispersion is adjusted to be acidic (for example, the pH is 2 or higher and 5 or lower). The dispersion is heated to a temperature of a glass transition temperature of the binder resin particles (specifically, for example, a temperature from the glass transition temperature of the binder resin particles −30° C. to the glass transition temperature −10° C.) to aggregate each of the particles dispersed in the dispersion, thereby forming the aggregated particles.

In the aggregating step, for example, the aggregating agent may be added at room temperature (for example, 25° C.) while stirring the dispersion using a rotary shearing-type homogenizer, the pH of the dispersion may be adjusted to be acidic (for example, the pH is from 2 or higher and 5 or lower), a dispersion stabilizer may be added if necessary, and then the heating may be performed.

Examples of the aggregating agent include a surfactant having an opposite polarity to the polarity of the polymer dispersant to be added to the dispersion, an inorganic metal salt, a divalent or higher metal complex. Particularly, when a metal complex is used as the aggregating agent, charging characteristics may be improved.

An additive for forming a bond of metal ions as the aggregating agent and a complex or a similar bond may be used, if necessary. A chelating agent is suitably used as the additive.

Examples of the inorganic metal salt include metal salt such as calcium chloride, calcium nitrate, barium chloride, magnesium chloride, zinc chloride, aluminum chloride, and aluminum sulfate, and an inorganic metal salt polymer such as poly aluminum chloride, poly aluminum hydroxide, and calcium polysulfide.

As the chelating agent, an aqueous chelating agent may be used. Examples of the chelating agent include oxycarboxylic acid such as tartaric acid, citric acid, and gluconic acid, iminodiacetic acid (IDA), nitrilotriacetic acid (NTA), and ethylenediaminetetraacetic acid EDTA).

The additive amount of the aggregating agent is, for example, preferably 0.01 parts by weight or more and 5.0 parts by weight or less, and more preferably 0.1 parts by weight or more and less than 3.0 parts by weight, with respect to 100 parts by weight of the binder resin particles.

The volume average particle diameter of the aggregated particles obtained by the aggregating step is not particularly limited, and may be appropriately selected according to a desired volume average particle diameter of the toner particles.

In addition, favorable aspects of each component contained in the toner particles, such as a binder resin, a release agent, and a coloring agent will be collectively described later.

<Coalescing Step>

The preparing method of an electrostatic charge image developing toner according to the exemplary embodiment includes a coalescing step of heating and coalescing the aggregated particles to form coalesced particles.

In the coalescing step, an aggregated particle dispersion in which the aggregated particles are dispersed is heated to, for example, a temperature that is the glass transition temperature or higher of the binder resin particles (for example, a temperature of the glass transition temperature or higher of the binder resin particles by 30° C. to 50° C.) and to a temperature that is a melting temperature or higher of the release agent to perform the coalesce on the aggregated particles and form the toner particles.

In the coalescing step, the binder resin and the release agent are in a coalesced state at a temperature that is the glass transition temperature or higher of the binder resin particles and a melting temperature or higher of the release agent. Then, cooling is performed to obtain the toner particles.

As a method of adjusting an aspect ratio of the release agent in the toner particles, crystal growth is performed by holding the release agent at the temperature around the freezing point of the release agent for a certain period of time during cooling, or two or more types of the release agents having different melting temperatures are used, whereby, crystal growth during cooling may be promoted and may be adjusted.

<Cleaning Step>

The preparing method of an electrostatic charge image developing toner according to the exemplary embodiment includes the cleaning step of filtering and cleaning the coalesced particle to obtain toner particles.

The cleaning in the cleaning step is preferably performed with water, and from the viewpoint of charging properly, it is more preferable to sufficiently perform replacement cleaning with ion exchanged water.

The amount of water to be used for the cleaning is not particularly limited, but is preferably the amount with which the polymer dispersant and the like are sufficiently removed.

In addition, the filtering in the cleaning step is not particularly limited, and a suction filtration, a pressure filtration, or the like may be performed from the viewpoint of productivity.

The preparing method of an electrostatic charge image developing toner according to the exemplary embodiment favorably includes a drying step of drying the toner particles after the cleaning step.

A drying method in the drying step is also not particularly limited, and freeze drying, airflow drying, fluidized drying, vibration-type fluidized drying, or the like may be performed from the viewpoint of productivity.

After the cleaning step, the content of the polymer dispersant in the toner particles after the drying step is preferably less than 100 ppm, preferably 50 ppm or less, and particularly preferably 10 ppm or less, from the viewpoints of a charging property in a high-temperature and high-humidity environment.

The preparing method of an electrostatic charge image developing toner according to the exemplary embodiment favorably includes a step of externally adding an external additive to the obtained toner particles.

The external adding method may be performed with, for example, a V-blender, a Henschel mixer, a Lodige mixer, or the like. Furthermore, if necessary, coarse particles of the toner may be removed by using a vibration classifier, a wind classifier, or the like.

<Binder Resin Particle Dispersion Preparing Step>

The preparing method of an electrostatic charge image developing toner according to the exemplary embodiment favorably includes a binder resin particle dispersion preparing step of preparing a hinder resin particle dispersion.

For example, a preparing method of an electrostatic charge image developing toner according to the exemplary embodiment along with the binder resin particle dispersion in which the binder resin particles are dispersed includes a step of preparing the coloring agent particle dispersion in which the coloring agent particles are dispersed and a step of preparing a release agent particle dispersion in which release agent particles are dispersed.

The resin particle dispersion is prepared, for example, by dispersing the resin particles in a dispersion medium with a surfactant.

Examples of the dispersion medium used for the resin particle dispersion include an aqueous medium.

Examples of the aqueous medium include water such as distilled water and ion exchanged water, and alcohols. These may be used alone, or two or more thereof may be used in combination.

Examples of the surfactant include anionic surfactants such as sulfate ester, sulfonate, phosphoric acid ester, and soap anionic surfactants; cationic surfactants such as amine salt and quaternary ammonium salt cationic surfactants; and nonionic surfactants such as polyethylene glycol, alkyl phenol ethylene oxide adduct, and polyhydric alcohol nonionic surfactants. Among them, anionic surfactants and cationic surfactants are particularly preferable. Nonionic surfactants may be used in combination with anionic surfactants or cationic surfactants.

The surfactants may be used alone, or two or more thereof may be used in combination.

Regarding the resin particle dispersion, as a method of dispersing the resin particles in the dispersion medium, a common dispersing method using, for example, a rotary shearing-type homogenizer, or a ball mill, a sand mill, or a Dyno mill as media is exemplified. Further, depending on the type of the resin particles, the resin particles may be dispersed in a dispersion medium by a phase inversion emulsification method. The phase inversion emulsification method includes: dissolving a resin to be dispersed in a hydrophobic organic solvent in which the resin is soluble; conducting neutralization by adding a base to an organic continuous phase (O phase); and performing phase inversion from W/O to O/W by adding an aqueous medium (W phase), thereby dispersing the resin as particles in the aqueous medium.

The volume average particle diameter of the resin particles dispersed in the resin particle dispersion is, for example, preferably 0.01 μm or more and 1 μm or less, more preferably 0.08 μm or more and 0.8 μm or less, and even more preferably 0.1 μm or more and 0.6 μm or less.

The content of the resin particles contained in the resin particle dispersion is preferably 5% by weight or more and 50% by weight or less, and more preferably 10% by weight or more and 40% by weight or less.

For example, the coloring agent particle dispersion and the release agent particle dispersion are also prepared in the same manner as in the case of the resin particle dispersion. That is, the particles in the resin particle dispersion are the same as the coloring agent particles dispersed in the coloring agent particle dispersion, and the release agent particle dispersed in the release agent particle dispersion, in terms of the volume average particle diameter, the dispersion medium, the dispersing method, and the content of the particles in the resin particle dispersion.

Further, the preparing method of an electrostatic charge image developing toner according to the exemplary embodiment may also include after the aggregating step, a step of further mixing a dispersion containing the aggregated particles and the resin particle dispersion in which the binder resin particles are dispersed and aggregating the binder resin particles so as to further adhere the surface of the aggregated particles to form second aggregated particles. The step of forming the second aggregated particles is gone through, thereby forming toner particles having a core-shell structure.

Further, the preparing method of an electrostatic charge image developing toner according to the exemplary embodiment may include known steps other than those described above.

Hereinafter, each component contained in the electrostatic charge image developing toner will be described in detail.

<Binder Resin>

The binder resin favorably contains an amorphous resin, and from the viewpoint of image strength and prevention of density unevenness in an image to be obtained, more favorably contains an amorphous resin and a crystalline resin. That is, in the aggregating step, amorphous resin particles and crystalline resin particles are more preferably contained as the binder resin particles.

Here, the amorphous resin has only a stepwise endothermic change, not clear endothermic peaks, in a thermal analysis measurement using differential scanning calorimetry (DSC), and refers to a solid at room temperature that is thermoplastic at a temperature that is the glass transition temperature or higher.

On the other hand, the crystalline resin refers to a resin having a clear endothermic peak instead of a stepwise endothermic change in differential scanning calorimetry (DSC).

Specifically, for example, the crystalline resin means that a half width of an endothermic peak when measured at a heating rate of 10° C./min is within 10° C., and the amorphous resin means a resin having a half width of higher than 10° C., or a resin in which a clear endothermic peak is not observed.

The amorphous resin will be described.

Examples of the amorphous resin include known amorphous resins such as an amorphous polyester resin, an amorphous vinyl resin (for example, styrene acrylic resin), an epoxy resin, a polycarbonate resin, and a polyurethane resin. Among these, the amorphous polyester resin and the amorphous vinyl resin (particularly, styrene acrylic resin) are preferable, and the amorphous polyester resin is more preferable, from the viewpoint of prevention of density unevenness and prevention of whiteout in the image to be obtained.

An aspect in which the amorphous polyester resin and the styrene acrylic resin are used in combination as the amorphous resin is preferable.

Examples of the amorphous polyester resin include a condensation polymer of polyvalent carboxylic acid and polyhydric alcohol. Note that, as the amorphous polyester resin, a commercially available product may be used, or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (for example, cyclohexanedicarboxylic acid), aromatic dicarboxylic acids (for example, terephthalic acid, isophthalic acid, phthalic acid, and naphthalenedicarboxylic acid), anhydrides thereof, or lower (for example, 1 or more carbon atom to 5 or less carbon atoms) alkyl esters thereof. Among these, as the polyvalent carboxylic acid, aromatic dicarboxylic acid is preferable.

The polyvalent carboxylic acid may be used in combination with dicarboxylic acid and trivalent or higher carboxylic acid having a crosslinked structure or a branched structure. Examples of the trivalent or higher carboxylic acid include trimellitic acid, pyromellitic acid, anhydrides thereof, and lower (for example, 1 or more carbon atom to 5 or less carbon atoms) alkyl esters thereof.

These polyvalent carboxylic acids may be used alone, or two or more thereof may be used in combination.

Examples of polyhydric alcohols include aliphatic diols (for example, ethylene glycol, diethylene glycol, triethylene glycol, propylene glycol, butanediol, hexanediol, and neopentyl glycol), alicyclic diols (for example, cyclohexanediol, cyclohexanedimethanol, and hydrogenated bisphenol A), and aromatic diols (for example, a bisphenol A ethylene oxide adduct and a bisphenol A propylene oxide adduct). Among these, as the polyhydric alcohol, the aromatic diols and the alicyclic diols are preferable, and the aromatic diols are more preferable.

As the polyhydric alcohol, tri- or higher polyhydric alcohol having a crosslinked structure or a branched structure may be used together with the diol. Examples of the tri- or higher polyhydric alcohol include glycerin, trimethylolpropane, and pentaerythritol.

These polyhydric alcohols may be used alone, or two or more thereof may be used in combination.

A known preparing method is used to prepare the amorphous polyester resin. Specific examples thereof include a method of conducting a reaction at a polymerization temperature set to be 180° C. of higher and 230° C. or lower, if necessary, under reduced pressure in the reaction system, while removing water or an alcohol generated during condensation. When monomers of the raw materials are not dissolved or compatibilized under a reaction temperature, a high-boiling-point solvent may be added as a solubilizing agent to dissolve the monomers. In this case, a polycondensation reaction is conducted while distilling away the solubilizing agent. When a monomer having poor compatibility is present in a copolymerization reaction, the monomer having poor compatibility and an acid or an alcohol to be polycondensed with the monomer may be previously condensed and then polycondensed with the major component.

Examples of the binder resin, particularly the amorphous resin, include a styrene acrylic resin.

The styrene acrylic resin is a copolymer obtained by copolymerizing at least a styrene-based monomer (a monomer having a styrene skeleton) and a (meth)acrylic monomer (a monomer having a (meth)acrylic group, preferably a monomer having a (meth)acryloxy group). The styrene acrylic resin contains, for example, a copolymer of a monomer of styrenes and a monomer of (meth)acrylic acid esters.

An acrylic resin portion of the styrene acrylic resin has a partial structure obtained by polymerizing either or both of an acrylic monomer and a methacrylic monomer. In addition, "(meth)acrylic" is an expression including both "acrylic" and "methacrylic".

Specific examples of the styrene-based monomer include styrene, alkyl-substituted styrene (for example, α-methylstyrene, 2-methylstyrene, 3-methylstyrene, 4-methylstyrene, 2-ethylstyrene, 3-ethylstyrene, and 4-ethylstyrene), halogen-substituted styrene (for example, 2-chlorostyrene, 3-chlorostyrene, and 4-chlorostyrene), and vinylnaphthalene. These styrene-based monomers may be used alone, or two or more thereof may be used in combination.

Among these, as the styrene-based monomer, the styrene is preferable from the viewpoint of ease of reaction, ease of reaction control, and availability.

Specific examples of the (meth)acrylic monomer include (meth)acrylic acid and (meth)acrylic acid ester. Examples of the (meth)acrylic acid ester include a (meth)acrylic acid alkyl ester (for example, methyl (meth)acrylate, ethyl (meth)acrylate, n-propyl (meth)acrylate, n-butyl (meth)acrylate, n-pentyl (meth)acrylate, n-hexyl acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, cyclohexyl (meth)acrylate, and t-butylcyclohexyl(meth)acrylate), (meth)acrylic acid aryl ester (for example, phenyl (meth)acrylate, biphenyl (meth)acrylate, diphenylethyl (meth)acrylate, t-butylphenyl (meth)acrylate, and terphenyl (meth)acrylate), dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, and (meth)acrylamide. These (meth)acrylic acid-based monomers may be used alone, or two or more thereof may be used in combination.

Among these (meth)acrylic esters in the (meth)acrylic monomers, from the viewpoint of fixability, (meth)acrylic acid esters having an alkyl group having 2 to 14 carbon atoms (preferably 2 to 10 carbon atoms and more preferably 3 to 8 carbon atoms) are preferable.

Among these, n-butyl (meth)acrylate is preferable, and n-butyl acrylate is particularly preferable.

A copolymerization ratio of the styrene-based monomer and the (meth)acrylic monomer (mass basis, styrene-based monomer/(meth)acrylic monomer) is not particularly limited, and is preferably from 85/15 to 70/30.

The styrene acrylic resin may have a crosslinked structure. Examples of the styrene acrylic resin having a crosslinked structure preferably include a resin obtained by copolymerizing at least a styrene-based monomer, a (meth) acrylic acid-based monomer, and a crosslinkable monomer.

Examples of the crosslinkable monomer include a bifunctional or higher functional crosslinking agent.

Examples of the bifunctional crosslinking agent include divinylbenzene, divinyl naphthalene, a di(meth)acrylate compound (for example, diethylene glycol di(meth)acrylate, methylene bis(meth)acrylamide, decanediol diacrylate, and glycidyl (meth)acrylate), polyester type di(meth)acrylate, and 2-([1'-methylpropylideneamino]carboxyamino)ethyl methacrylate.

Examples of the polyfunctional crosslinking agent include a tri(meth)acrylate compound (for example, pentaerythritol tri(meth)acrylate, trimethylolethane tri(meth) acrylate, and trimethylolpropane tri(meth)acrylate), a tetra (meth)acrylate compound (for example, pentaerythritol tetra (meth)acrylate and oligoester(meth)acrylate), 2,2-bis(4-methacryloxy, polyethoxypheny)propane, dialyl phthalate, triallyl cyanurate, triallyl isocyanurate, triallyl trimeritate, and dialyl chlorendate.

Among these, as the crosslinkable monomer, from the viewpoints of preventing an image density reduction from occurring and the image density unevenness from occurring and the viewpoint of fixability, the bifunctional or higher (meth)acrylate compound is preferable, the bifunctional (meth)acrylate compound is more preferable, the bifunctional (meth)acrylate compound having air alkylene group having 6 or more carbon atoms to 20 or less carbon atoms is even more preferable, and the bifunctional (meth)acrylate compound having a linear alkylene group having 6 or more carbon atoms to 20 or less carbon atoms is particularly preferable.

A copolymerization ratio of the crosslinkable monomer with respect to a total monomer (mass basis, crosslinkable monomer/total monomer) is not particularly limited, and is preferably 2/1,000 or more and 20/1,000 or less.

A production method of the styrene acrylic resin is not particularly limited, and various polymerization methods (for example, solution polymerization, precipitation polymerization, suspension polymerization, bulk polymerization, and emulsion polymerization) are adopted. Further, a known operation (for example, batch type, semi-continuous type, and continuous type) is adopted to the polymerization reaction.

A proportion of the styrene acrylic resin to the total binder resin is preferably 0% by weight or more and 20% by weight or less, more preferably 1% by weight or more and 15% by weight or less, and even more preferably 2% by weight or more and 10% by weight or less.

A proportion of the amorphous resin to the total binder resin is preferably 60% by weight or more and 98% by weight or less, more preferably 65% by weight or more and 95% by weight or less, and even more preferably 70% by weight or more and 90% by weight or less.

Properties of the amorphous resin will be described.

A glass transition temperature (Tg) of the amorphous resin is preferably 50° C. or higher and 80° C. or lower, and more preferably 50° C. or higher and 65° C. or lower.

The glass transition temperature is obtained from a DSC curve obtained by differential scanning calorimetry (DSC). More specifically, the glass transition temperature is obtained from "extrapolated glass transition onset temperature" described in the method of obtaining a glass transition temperature in TIS K 7121-1987 "testing methods for transition temperatures of plastics".

A weight average molecular weight (Mw) of the amorphous resin is preferably 5,000 or more and 1,000,000 or less, and more preferably 7,000 or more and 500,000 or less.

A number average molecular weight (Mn) of the amorphous resin is preferably 2,000 or more and 100,000 or less.

A molecular weight distribution Mw/Mn of the amorphous resin is preferably 1.5 or more and 100 or less, and is more preferably 2 or more and 60 or less.

The weight average molecular weight and the number average molecular weight are measured by gel permeation chromatography (GPC). The molecular weight measurement by GPC is performed using GPC-HLC-8120 GPC, manufactured by Tosoh Corporation as a measuring device, Column TSK gel Super HM-M (15 cm), manufactured by Tosoh Corporation, and a THF solvent. The weight average molecular weight and the number average molecular weight are calculated by using a molecular weight calibration curve plotted from a monodisperse polystyrene standard sample from the results of the foregoing measurement.

The crystalline resin will be described.

Examples of the crystalline resin include known crystalline resins such as a crystalline polyester resin and a crystalline vinyl resin (for example, a polyalkylene resin and a long-chain alkyl (meth)acrylate resin). Among these, the crystalline polyester resin is preferable from the viewpoint of prevention of density unevenness and prevention of whiteout in the image to be obtained.

Examples of the crystalline polyester resin include a polycondensate of polyvalent carboxylic acid and polyhydric alcohol. Note that, as the crystalline polyester resin, a commercially available product may be used, or a synthetic resin may be used.

Since the crystalline polyester resin easily forms a crystal structure, a polycondensate using a linear aliphatic polymerizable monomer is more preferable than a polymerizable monomer having an aromatic ring.

Examples of the polyvalent carboxylic acid include aliphatic dicarboxylic acids (for example, oxalic acid, succinic acid, glutaric acid, adipic acid, suberic acid, azelaic acid, sebacic acid, 1,9-nonandicarboxylic acid, 1,14-decanedicarboxylic acid, 1,12-dodecandicarboxylic acid, 1,14-tetradecandicarboxylic acid, and 1,18-octadecanedicarboxylic acid), aromatic dicarboxylic acids (for example, dibasic acids such as phthalic acid, isophthalic acid, terephthaiic acid, and naphthalene-2,6-dicarboxylic acid), anhydrides thereof, or lower (for example, 1 or more carbon atom to 5 or less carbon atoms) alkyl esters thereof.

The polyvalent carboxylic acid may be used in combination with dicarboxylic acid and trivalent or higher carboxylic acid having a crosslinked structure or a branched structure. Examples of the trivalent carboxylic acid include aromatic carboxylic acids (for example, 1,2,3-benzenetricarboxylic acid, 1,2,4-benzenetricarboxylic acid, and 1,2,4-naphthalenetricarboxylic acid), anhydrides thereof, or lower (for example, 1 or more carbon atom to 5 or less carbon atoms) alkyl esters thereof.

As the polyvalent carboxylic acid, a dicarboxylic acid having a sulfonic acid group and a dicarboxylic acid having an ethylenic double bond may be used in combination with these dicarboxylic acids.

These polyvalent carboxylic acids may be used alone, or two or more thereof may be used in combination.

Examples of the polyhydric alcohol include an aliphatic diol (for example, a linear aliphatic diol having 7 to 21) carbon atoms in a main chain portion). Examples of the aliphatic diol include ethylene glycol, 1,3-propanediol, 1,4-butanediol, 1,5-pentanediol, 1,6-hexanediol, 1,7-heptanediol, and 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these, as the aliphatic diol, the 1,8-octanediol, the 1,9-nonanediol, and the 1,10-decanediol are preferable.

As the polyhydric alcohol, trihydric or higher alcohol having a crosslinked structure or a branched structure may be used together with the diols. Examples of the trihydric or higher alcohol include glycerin, trimethylolethane, trimethylolpropane, and pentaerythritol.

These polyhydric alcohols may be used alone, or two or more thereof may be used in combination.

The content of the aliphatic diol n the polyhydric alcohol may be 80 mol % or more, preferably 90 mol % or more.

The melting temperature of the crystalline polyester resin is preferably 50° C. or higher and 100° C. or lower, more preferably 55° C. or higher and 90° C. or lower, and even more preferably 60° C. or higher and 85° C. or lower.

Note that, the melting temperature of the crystalline polyester resin is obtained from a DSC curve obtained by differential scanning calorimetry (DSC), and specifically obtained from "melting peak temperature" described in the method of obtaining a melting temperature in JIS K 7121: 1987 "testing methods for transition temperatures of plastics".

A weight average molecular weight (Mw) of the crystalline polyester resin is preferably 6,000 or more and 35,000 or less.

The crystalline polyester resin may be obtained by a known preparing method, similar to the amorphous polyester resin, for example.

As the crystalline polyester resin, a polymer of α,ω-linear aliphatic dicarboxylic acid and α,ω-linear aliphatic diol is preferable from the viewpoint of easily forming a crystal structure and the viewpoint of having good compatibility with the amorphous polyester resin, and as a result, improving the fixability of an image.

As the α,ω-linear aliphatic dicarboxylic acid, α,ω-linear aliphatic dicarboxylic acid having an alkylene group having 3 or more carbon atoms to 14 or less carbon atoms and connecting two carboxy groups is preferable, and the alkylene group more preferably has 4 or more carbon atoms and 12 or less carbon atoms, and the alkylene group even more preferably has 6 or more carbon atoms and 10 or less carbon atoms.

Examples of the α,ω-linear aliphatic dicarboxylic acid include succinic acid, glutaric acid, adipic acid, 1,6-hexanedicarboxylic acid (common name suberic acid), 1,7-heptanedicarboxylic acid (common name azelaic acid), 1,8-octanedicarboxylic acid (common name sebacic acid), 1,9-nonandicarboxylic acid, 1,10-decanedicarboxylic acid, 1,12-dodecanedicarboxylic acid, 1,14-tetradecandicarboxylic acid, and 1,18-octadecanedicarboxylic acid. Among these, the 1,6-hexanedicarboxylic acid, the 1,7-heptanedicarboxylic acid, the 1,8-octanedicarboxylic acid, the 1,9-nonandicarboxylic acid, and 1,10-decanedicarboxylic acid are preferable.

These α,ω-linear aliphatic dicarboxylic acids may be used alone, or two or more thereof may be used in combination.

As the α,ω-linear aliphatic diol, α,ω-linear aliphatic diol having an alkylene group having 3 or more carbon atoms to 14 or less carbon atoms and connecting two hydroxy groups is preferable, and the alkylene group more preferably has 4 or more carbon atoms and 12 or less carbon atoms, and the alkylene group even more preferably has 6 or more carbon atoms and 10 or less carbon atoms.

Examples of the α,ω-linear aliphatic diol include ethylene glycol, 1,3-propanediol, 1,4-butanediol, 1,5-pentanedial, 1,6-hexanediol, 1,7-heptanediol, 1,8-octanediol, 1,9-nonanediol, 1,10-decanediol, 1,12-dodecanediol, 1,14-tetradecanediol and 1,18-octadecanediol. Among these, the 1,6-hexanediol, the 1,7-heptanediol, 1,8-octanediol, 1,9-nonanediol, and 1,10-decanediol are preferable.

These α,ω-linear aliphatic dials may be used alone, or two or more thereof may be used in combination.

As the polymer of the α,ω-linear aliphatic dicarboxylic acid and the α,ω-linear aliphatic diol, a polymer of at least one selected from the group consisting of 1,6-dexanedicarboxylic acid, 1,7-heptanedicarboxylic acid, 1,8-octanedicarboxylic acid, 1,9-nonanedicarboxylic acid, and 1,10-decanedicarboxylic acid and at least one selected from the group consisting of 1,6-hexanediol, 1,7-heptanediol, 1,8-octanediol, 1,9-nonanediol, and 1,10-decanediol is preferable from the viewpoint of easily forming a crystal structure and the viewpoint of having good compatibility with the amorphous polyester resin, and as a result, improving the fixability of an image. Among these, a polymer of the 1,10-decanedicarboxylic acid and 1,6-hexanediol is more preferable.

A proportion of the crystalline resin to the total binder resin is preferably 1% by weight or more and 20% by weight or less, more preferably 2% by weight or more and 15% by weight or less, and even more preferably 3% by weight or more and 10% by weight or less.

Other Binder Resins

Examples of the binder resin include homopolymers of monomers such as ethylenically unsaturated nitriles (for example, acrylonitrile and methacrylonitrue), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene), or copolymers of two or more of these monomers.

Examples of other binder resins also include a non-vinyl resin such as an epoxy resin, a polyurethane resin, a polyamide resin, a cellulose resin, a polyether resin, and a modified rosin, a mixture of these resins and the vinyl-based resin, or a graft polymer obtained by polymerizing a vinyl monomer in the coexistence.

These binder resins may be used alone, or two or more thereof may be used in combination.

The content of the binder resin is preferably 40% by weight or more and 95% by weight or less, more preferably 50% by weight or more and 90% by weight or less, and even more preferably 60% by weight or more and 85% by weight or less, with respect to the entire toner particles.

Release Agent

Examples of the release agent include hydrocarbon waxes; natural waxes such as carnauba wax, rice wax, and candelilla wax; synthetic or mineral/petroleum waxes such as montan wax; and ester waxes such as fatty acid esters and montanic acid esters. The release agent is not limited to the examples.

As the release agent, ester wax is preferable from the viewpoint of prevention of density unevenness and prevention of whiteout in the image to be obtained and the viewpoint of having good compatibility with the amorphous polyester resin, and as a result, improving the fixability of an image, and ester wax containing higher fatty acid having 10 or more carbon atoms and 30 or less carbon atoms and monohydric or polyhydric alcohol components having 1 or more carbon atoms and 30 or less carbon atoms are more preferable.

The ester wax is a wax having an ester bond. The ester wax may be any of monoester, diester, triester, and tetraester, and known natural or synthetic ester waxes may be used.

Examples of the ester wax include an ester compound of a higher fatty acid (such as fatty acid having 10 or more carbon atoms) and a monohydric or polyhydric aliphatic alcohol (such as aliphatic alcohol having 8 or more carbon atoms), the ester compound having a melting temperature of 60° C. or higher and 110° C. or lower (preferably 65° C. or higher and 100° C. or lower, and more preferably 70° C. or higher and 95° C. or lower).

Examples of the ester wax include ester compounds of higher fatty acid (such as caprylic acid, capric acid, Laurie acid, myristic acid, palmitic acid, stearic acid, arachidic acid, behenic acid, and oleic acid) and alcohol (monohydric alcohols such as methanol, ethanol, propanol, isopropanol, butanol, capryl alcohol, lauryl alcohol, myristyl alcohol, cetyl alcohol, stearyl alcohol, and oleyl alcohol; and polyhydric alcohols such as glycerin, ethylene glycol, propylene glycol, sorbitol, and pentaerythritol). Specific examples thereof include carnauba wax, rice wax, candelilla wax, jojoba oil, wood wax, beeswax, ibota wax, lanolin, and montanic acid ester wax.

The melting temperature of the release agent is preferably 50° C. or higher and 110° C. or lower, and more preferably 60° C. or higher and 100° C. or lower.

The melting temperature of the release agent is obtained from a DSC curve obtained by differential scanning calorimetry (DSC), and specifically obtained from "melting peak temperature" described in the method of obtaining a melting temperature in JIS K 7121: 1987 "testing methods for transition temperatures of plastics".

The content of the release agent is preferably 1% by weight or more and 20% by weight or less, and more preferably 5% by weight or more and 15% by weight or less, with respect to the entire toner particles.

Coloring Agent

In the aggregating step, the dispersion favorably further contains coloring agent particles.

Examples of the coloring agent includes various types of pigments such as carbon black, chrome yellow, Hansa yellow, benzidine yellow, threne yellow, quinoline yellow, pigment yellow, Permanent Orange GTR, Pyrazolone Orange, Vulcan Orange, Watch Young Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate, or various types of dyes such as acridine dye, xanthene dye, azo dye, benzoquinone dye, azine dye, anthraquinone dye, thioindigo dye, dioxazine dye, thiazine dye, azomethine dye, indigo dye, phthalocyanine dye, aniline black dye, polymethine dye, triphenylmethane dye, diphenyimethane dye, and thiazole dye.

These coloring agents may be used alone, or two or more thereof may be used in combination.

As the coloring agent, if necessary, a surface-treated coloring agent may be used, or a dispersant may be used in combination. In addition, as the coloring agent, plural types of coloring agents may be used in combination.

The content of the coloring agent is preferably 1% by weight or more and 30% by weight or less, and more preferably 3% by weight or more and 15% by weight or less, with respect to the entire toner particles.

Other Additives

Examples of other additives include well-known additives such as a magnetic substance, a charge-controlling agent, and an inorganic powder. These additives are contained in the toner particle as internal additives.

Properties of Toner Particles

The toner particles may be toner particles (core-shell type particles) having a single-layer structure, or may be a so-called core-shell structure composed of a core (core particle) and a coating layer (shell layer) coating the core. The toner particles having a core-shell structure include, for example, a core containing a binder resin and, as needed, the coloring agent and the release agent, and a coating layer containing a binder resin.

Among these, the toner particles are preferably core-shell type particles, from the viewpoint of low-temperature fixability and color streak generation prevention property.

The volume average particle diameter ($D_{50v}$) of the toner particles is preferably 2 μm or more and 10 μm or less and more preferably 4 μm or more and 8 μm or less.

The volume average particle diameter of the toner is measured using Coulter Multisizer Type II (manufactured by Beckman Coulter, Inc.) and an electrolytic solution is measured using ISOTON-II (manufactured by Beckman Coulter, Inc.).

In the measurement, a measurement sample of 0.5 mg or more and 50 mg or less is added to 2 mL of 5% by weight aqueous solution of a surfactant (preferably sodium alkylbenzene sulfonate) as a dispersant. This is added to 100 mL or more and 150 mL or less of the electrolytic solution.

The electrolytic solution in which the sample is suspended is dispersed for 1 minute by an ultrasonic disperser. Then, using the Coulter Multisizer type II, each particle diameter of the particles having particle diameters of 2 μm or more and 60 μm or less is measured using an aperture having an aperture diameter of 100 μm. The number of particles to be sampled is 50,000.

In the measured particle diameter, a volume-based cumulative distribution is drawn from the small diameter side, and a particle diameter at a cumulative total of 50% is defined as the volume average particle diameter $D_{50v}$.

In the exemplary embodiment, an average circularity of the toner particles is not particularly limited, and from the viewpoint of improving the cleanability of the toner from the image holding member, is preferably 0.91 or more and 0.98 or less, more preferably 0.94 or more and 0.98 or less, and even more preferably 0.95 or more and 0.97 or less.

In the exemplary embodiment, the circularity of the toner particles is (Perimeter of a circle with the same area as a particle projection image)/(Perimeter of the particle projection image), and an average circularity of the toner particles is the circularity with a cumulative 50% from the small circularity side in the distribution of circularity. The average circularity of the toner particles is determined by analyzing at least 3,000 toner particles with a flow-type particle image analyzer.

The average circularity of the toner particles may be controlled, for example, by adjusting a stirring speed of the dispersion and a temperature or the keeping time of the dispersion, in the coalescing step.

Further, the amount of the release agent on the surface of the toner particles may be controlled by, for example, adjusting a charge amount of the release agent, kinds of the release agent, and temperature during melt kneading, carrying out a surface treatment with hot air after pulverization, and the like.

<External Additive>

The toner prepared by the preparing method of an electrostatic charge image developing toner according to the exemplary embodiment may contain an external additive, if necessary.

Further, the toner prepared by the preparing method of an electrostatic charge image developing toner according to the exemplary embodiment may be toner particles having no external additives or toner particles to which the external additive is added.

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO·SiO_2$, $K_2O·(TiO_2)$, $Al_2O_3·2SiO_2$, $CaCO_3$, $MgCO_3$, $BaSO_4$, $MgSO_4$, and the like.

The surface of the inorganic particles as the external additive may be treated with a hydrophobizing agent. The hydrophobic treatment is performed, for example, by immersing the inorganic particles in a hydrophobizing agent. The hydrophobizing agent is not particularly limited, and examples thereof include a silane coupling agent, a silicone oil, a titanate coupling agent, and an aluminum coupling agent. These may be used alone, or two or more thereof may be used in combination.

The amount of the hydrophobizing agent is preferably, for example, 1 part by weight or more and 10 parts by weight or less with respect to 100 parts by weight of the inorganic particles.

Examples of the external additive also include a resin particle (resin particles such as polystyrene, polymethylmethacrylate (PMMA), and melamine resin), a cleaning aid (for example, a metal salt of higher fatty acid typified by zinc stearate, and a particle of fluorine-based polymer), and the like.

The external addition amount of the external additives is, for example, preferably 0.01% by weight or more and 10% by weight or less, and more preferably 0.01% by weight or more and 6% by weight or less, with respect to the toner particles.

<Electrostatic Charge Image Developer>

An electrostatic charge image developer according to the exemplary embodiment is a developer containing at least the toner prepared by the preparing method of an electrostatic charge image developing toner according to the exemplary embodiment.

The electrostatic charge image developer according to the exemplary embodiment may be a single-component developer containing only the toner prepared by the preparing method of an electrostatic charge image developing toner according to the exemplary embodiment, or a two-component developer obtained by mixing the toner with a carrier.

The carrier is not particularly limited, and a well-known carrier may be used. Examples of the carrier include a coating carrier in which the surface of the core formed of magnetic particles is coated with the coating resin; a magnetic particle dispersion-type carrier in which the magnetic particles are dispersed and distributed in the matrix resin; and a resin impregnated-type carrier in which a resin is impregnated into the porous magnetic, particles.

Note that, the magnetic particle dispersion-type carrier and the resin impregnated-type carrier may be a carrier in which the forming particle of the aforementioned carrier is set as a core and the core is coated with the coating resin.

Examples of the magnetic particle include a magnetic metal such as iron, nickel, and cobalt, and a magnetic oxide such as ferrite, and magnetite.

Examples of the coating resin and the matrix resin include a straight silicone resin formed by containing polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, and an organosiloxane bond, or the modified products thereof, a fluororesin, polyester, polycarbonate, a phenol resin, and an epoxy resin.

Note that, other additives such as the conductive particles may be contained in the coating resin and the matrix resin.

Examples of the conductive particles include metal such as gold, silver, and copper, carbon black, titanium oxide, zinc oxide, tin oxide, barium sulfate, aluminum borate, and potassium titanate.

Here, in order to coat the surface of the core with the coating resin, a method of coating the surface with a coating layer forming solution in which the coating resin, and various additives if necessary are dissolved in a proper solvent is used. The solvent is not particularly limited as long as a solvent is selected in consideration of a coating resin to be used and coating suitability.

Specific examples of the resin coating method include a dipping method of dipping the core into the coating layer forming solution, a spray method of spraying the coating layer forming solution onto the surface of the core, a fluid-bed method of spraying the coating layer forming solution to the core in a state of being floated by the fluid air, and a kneader coating method of mixing the core of the carrier with the coating layer forming solution and removing a solvent in the kneader coater.

The mixing ratio (mass ratio) of the toner to the carrier in the two-component developer is preferably in a range of toner:carrier=1:100 or more and 30:100 or less, and is further preferably in a range of 3:100 or more and 20:100 or less.

<Image Forming Apparatus/Image Forming Method>

An image forming apparatus/image forming method according to the exemplary embodiment will be described.

The image forming apparatus according to the exemplary embodiment includes an image holding member, a charging unit that charges a surface of the image holding member, an electrostatic charge image forming unit that forms an electrostatic charge image on the surface of the charged image holding member, a developing unit that contains an electrostatic charge image developer and develops an electrostatic charge image formed on the surface of the image holding member as a toner image with the electrostatic charge image developer, a transfer unit that transfers the toner image formed on the surface of the image holding member to a surface of a recording medium, and a fixing unit that fixes the toner image transferred to the surface of the recording medium. In addition, the electrostatic charge image developer according to the exemplary embodiment is applied as the electrostatic charge image developer.

In the image forming apparatus according to the exemplary embodiment, an image forming method (image forming method according to the exemplary embodiment) including charging a surface of the image holding member, forming an electrostatic charge image on the surface of the charged image holding member, developing an electrostatic charge image formed on the surface of the image holding member as a toner image with an electrostatic charge image developer according the exemplary embodiment, transferring the toner image formed on the surface of the image holding member to a surface of a recording medium, and fixing the toner image transferred to the surface of the recording medium is performed.

As the image forming apparatus according to the exemplary embodiment, well-known image forming apparatuses such as a direct-transfer type apparatus that directly transfers the toner image formed on the surface of the image holding member to the recording medium; an intermediate transfer type apparatus that primarily transfers the toner image formed on the surface of the image holding member to a surface of an intermediate transfer member, and secondarily transfers the toner image transferred to the surface of the intermediate transfer member to the surface of the recording medium; an apparatus provided with a cleaning unit that cleans the surface of the image holding member before being charged and after transferring the toner image; and an apparatus provided with an erasing unit that erases charges by irradiating the surface of the image holding member with erasing light before being charged and after transferring the toner image.

Among these, an image forming apparatus provided with the cleaning unit that cleans the surface of the image holding member may be suitably used. Further, as the cleaning unit, a cleaning blade is preferable.

In a case where the intermediate transfer type apparatus is used, the transfer unit includes an intermediate transfer member that transfers the toner image to the surface, a primary transfer unit that primarily transfers the toner image formed on the surface of the image holding member to the surface of the intermediate transfer member, and a secondary transfer unit the toner image transferred to the surface of the intermediate transfer member is secondarily transferred to the surface of the recording medium.

In the image forming apparatus according to the exemplary embodiment, for example, a portion including the developing unit may be a cartridge structure (process cartridge) that is detachably attached to the image forming apparatus. As the process cartridge, for example, a process cartridge provided with a developing unit that contains the electrostatic charge image developer according to the exemplary embodiment is preferably used.

Hereinafter, an example of the image forming apparatus according to the exemplary embodiment will be described, but the exemplary embodiment is not limited thereto. The main parts illustrated in the drawings will be described, and the description of the other parts will be omitted.

FIG. 1 is a schematic configuration diagram illustrating an image forming apparatus according to the exemplary embodiment.

The image forming apparatus as illustrated in FIG. 1 is provided with electrophotographic type of first to fourth image forming units 10Y, 10M, 10C, and 10K (image forming units) that output images of the respective colors of yellow (Y), magenta (M), cyan (C), and black (K) based on color-separated image data. These image forming units 10Y, 10M, 10C, and 10K (hereinafter, simply referred to as a "unit" in some cases) are arranged apart from each other by a predetermined distance in the horizontal direction. Note that, the units 10Y, 10M, 10C, and 10K may be the process cartridge which is detachable with respect to the image forming apparatus.

As an intermediate transfer member, an intermediate transfer belt 20 passing through the respective units is extended upward in the drawing of the respective units 10Y, 10M, 10C, and 10K. The intermediate transfer belt 20 is wound on a support roller 4 coming in contact with a driving roller 22 and the inner surface of an intermediate transfer belt 20 which are disposed apart from each other in the horizontal direction in the drawing, and travels to the direction from the first unit 10Y to the fourth unit 10K. In addition, a force is applied to the support roller 24 in the direction apart from the driving roller 22 by a spring (not shown), and thus a tension is applied to the intermediate transfer belt 20 which is wound by both. Further, an intermediate transfer member cleaning device 30 is provided on the side surface of the image holding member of the intermediate transfer belt 20 so as to face the driving roller 22.

In each of developing devices (developing unit) 4Y, 4M, 4C, and 4K of the each of the units 10Y, 10M, 10C, and 10K, four colors toner of yellow, magenta, cyan, and black stored in toner cartridges 8Y, 8M, 8C, and 8K are correspondingly supplied to each of the developing devices 4Y, 4M, 4C, and 4K.

The first to fourth units 10Y, 10M, 10C, and 10K have the same configuration as each other, and thus the first unit 10Y for forming a yellow image disposed on the upstream side the travel direction of the intermediate transfer belt will be representatively described. Note that, the description for the second to fourth units 10M, 10C, and 10K will be omitted by denoting reference numeral with magenta (M), cyan (C), and black (K) instead of yellow (Y) to the same part as that of the first unit 10Y.

The first unit 10Y includes a photosensitive body 1Y acting as an image holding member. In the vicinity of the photosensitive body 1Y, a charging roller (an example of the charging unit) 2Y which charges the surface of the photosensitive body 1Y with a predetermined potential, an exposure device (an example of the electrostatic charge image forming unit) 3 which exposes the charged surface by using a laser beam 3Y based on color separated image signal so as to form an electrostatic charge image, a developing device (an example of the developing unit) 4Y which supplies the charged toner to the electrostatic charge image and develops the electrostatic charge image, a primary transfer roller 5Y (an example of the primary transfer unit) which transfers the developed toner image onto the intermediate transfer belt 20, and a photosensitive body cleaning device (an example of the cleaning unit) 6Y which removes the toner remaining on the surface of the photosensitive body 1Y after primary transfer are sequentially disposed.

Note that, the primary transfer roller 5Y is disposed inside the intermediate transfer belt 20, and is provided at a position facing the photosensitive body 1Y. Further, bias power supply (not shown) which is applied to the primary transfer bias is connected to each of the primary transfer rollers 5Y, 5M, 5C, and 5K. The bias power supply is changed to the transfer bias which is applied to applying to the primary transfer roller by control of a control unit (not shown).

Hereinafter, an operation of forming a yellow image in the first unit 10Y will be described.

First, before starting the operation, the surface of the photosensitive body 1Y is charged with the potential in a range of −600 V to −800 V by the charging roller 2Y.

The photosensitive body 1Y is formed by laminating a photosensitive layer on a conductive (for example, volume resistivity at 20° C.: $1\times10^{-6}$ Ωcm or less) substrate. This photosensitive layer usually has a high resistance (resistance of a general resin), but has a property that when irradiated with the laser beam 3Y, resistivity of the portion irradiated with the laser beam changes. In this regard, in accordance with image data for yellow transmitted from the control unit (not shown), the laser beam 3Y is output to the charged surface of the photosensitive body 1Y via the exposure device 3. The photosensitive layer of the surface of the photosensitive body 1Y is irradiated with the laser beam 3Y, and thereby, the electrostatic charge image of a yellow image pattern is formed on the surface of the photosensitive body 1Y.

The electrostatic charge image means an age formed on the charged surface of the photosensitive body 1Y, in which resistivity of a portion of the photosensitive layer to be irradiated with the laser beam 3Y is decreased, and the charges for charging the surface of the photosensitive body 1Y flow; on the other hand, electrostatic charge image means a so-called negative latent image which is formed when charges of a portion which is not irradiated with the laser beam 3Y remain.

The electrostatic charge image formed on the photosensitive body 1Y is rotated to the predetermined developing position in accordance with the traveling of the photosensitive body 1Y. Further, the developing position, the electrostatic charge image on the photosensitive body 1Y is visualized (developed) as a toner image by the developing device 4Y.

The developing device 4Y contains, for example, an electrostatic charge image developer including at least a yellow toner and a carrier. The yellow toner is frictionally charged by being stirred in the developing device 4Y to have a charge with the same polarity (negative polarity) as the charge that is charged on the photosensitive body 1Y, and is thus held on the developer roller (an example of the developer holding member). By allowing the surface of the photosensitive body 1Y to pass through the developing device 4Y, the yellow toner electrostatically adheres to the erased latent image part on the surface of the photosensitive body 1Y, whereby the latent image is developed with the yellow toner. Next, the photosensitive body 1Y having the yellow toner image formed thereon continuously travels at a predetermined rate and the toner image developed on the photosensitive body 1Y is supplied to a predetermined primary transfer position.

When the yellow toner image on the photosensitive body 1Y is conveyed to the primary transfer, a primary transfer bias is applied to the primary transfer roller 5Y, and an electrostatic force from the photosensitive body 1Y to the primary transfer roller 5Y acts on the toner image. The toner image on the photosensitive body 1Y is transferred onto the intermediate transfer belt 20. The transfer bias applied at this time has a polarity (+) opposite to the polarity (−) of the toner. For example, in the first unit 10Y, the control unit (not shown) controls the transfer bias to ±10 μA.

On the other hand, the toner remaining on the photosensitive body 1Y is removed and collected by the photosensitive body cleaning device 6Y.

Further, the primary transfer biases that are applied to the primary transfer rollers 5M, 5C, and 5K of the second unit 10M and the subsequent units are also controlled in the same manner as in the case of the first unit.

In this manner, the intermediate transfer belt 20 onto which the yellow toner image is transferred in the first unit 10Y is sequentially supplied through the second to fourth units 10M, 10C, and 10K, and the toner images of respective colors are multiply-transferred in a superimposed manner.

The intermediate transfer belt 20 onto which the four color toner images have been multiply-transferred through the first to fourth units reaches a secondary transfer part that is composed of the intermediate transfer belt 20, the support roller 24 contacting the inner surface of the intermediate transfer belt, and a secondary transfer roller (an example of the secondary transfer unit) 26 disposed on the image holding surface side of the intermediate transfer belt 20. Meanwhile, a recording sheet (an example of the recording medium) P is supplied to a gap between the secondary transfer roller 26 and the intermediate transfer belt 20, that are brought into contact with each other, via a supply mechanism at a predetermined timing, and a secondary transfer bias is applied to the support roller 24. The transfer bias applied at this time has the same polarity (−) as the toner polarity (−), and an electrostatic force toward the recording sheet P from the intermediate transfer belt 20 acts on the toner image, whereby the toner image on the intermediate transfer belt 20 is transferred onto the recording sheet P. In this case, the secondary transfer bias is determined depending on the resistance detected by a resistance detecting unit (not shown) that detects the resistance of the secondary transfer part, and is voltage-controlled.

Thereafter, the recording sheet P is fed to a nip portion (nip part) between a pair of fixing rollers in a fixing device (an example of the fixing unit) 28 so that the toner image is fixed to the recording sheet P, whereby a fixed image is formed.

Examples of the recording sheet P to which the toner image is transferred include plain paper that is used in electrophotographic copying machine, printers, and the like. An OHP sheet is also exemplified as the recording medium in addition to the recording sheet P.

In order to further improve the smoothness of the image surface after fixing, the surface of the recording sheet P is also preferably smooth. For example, coated paper in which the surface of plain paper is coated with a resin or the like, art paper for printing, and the like are preferably used.

The recording sheet P on which the fixing of the color image is completed is discharged toward a discharge part, and a series of the color image forming operations end.

<Process Cartridge/Toner Cartridge>

The process cartridge according to the exemplary embodiment will be described.

The process cartridge according to the exemplary embodiment stores the electrostatic charge image developer according to the exemplary embodiment includes a developing unit that contains the electrostatic charge image developer according to the exemplary embodiment and develops an electrostatic charge image formed on the surface of an image holding member as a toner image with the electrostatic charge image developer, the process cartridge is detachably attached to the image forming apparatus.

The process cartridge according to the exemplary embodiment is not limited to the above-described configuration, and may have a configuration of including a developing device and, as needed, at least one selected from other units such as an image holding member, a charging unit, an electrostatic charge image forming unit, and a transfer unit.

Hereinafter, an example of the process cartridge according to this exemplary embodiment will be shown. However, the process cartridge is not limited thereto. The main parts illustrated in the drawings will be described, and the description of the other parts will be omitted.

Figure 2:
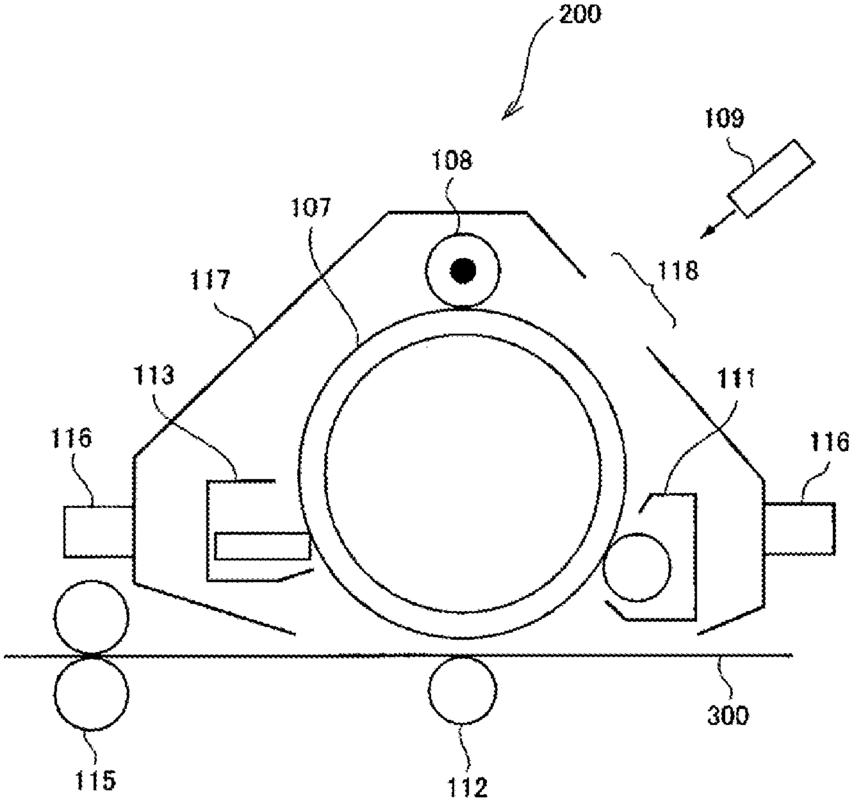
FIG. 2 is a schematic configuration diagram illustrating an example of a process cartridge according to the exemplary embodiment.

FIG. 2 is a schematic configuration diagram illustrating a process cartridge according to the exemplary embodiment.

The process cartridge 200 illustrated in FIG. 2 is configured such that an photosensitive body 107 (an example of the image holding member), a charging roller 108 (an example of the charging unit) which is provided in the vicinity of the electrophotographic photosensitive body 107, a developing device 111 (an example of the developing unit), and a photosensitive body cleaning device 113 (an example of the cleaning unit) are integrally formed in combination, and are held by a housing 117 which is provided with an attached rail 116 and an opening portion 118 for exposing light.

Note that, in FIG. 2, reference numeral 109 is denoted as an exposure device (an example of the electrostatic charge image forming unit), reference numeral 112 is denoted as a transfer device (an example of the transfer unit), reference numeral 115 is denoted as a fixing device (an example of the fixing unit), and reference numeral 300 is denoted as a recording sheet (an example of the recording medium).

Next, a toner cartridge according to the exemplary embodiment will be described.

The toner cartridge according to the exemplary embodiment is a toner cartridge that contains the toner according to the exemplary embodiment and is detachably attached to the image forming apparatus. The toner cartridge contains a toner for replenishment to be supplied to the developing unit provided in the image forming apparatus.

The image forming apparatus illustrated in FIG. 1 is an image forming apparatus having a configuration in which toner cartridges 8Y, 8M, 8C, and 8K are detachably attached to the image forming apparatus, and the developing devices 4Y, 4M, 4C, and 4K are connected to toner cartridges corresponding to the respective developing devices (colors) through a toner supply pipe (not shown). In addition, in a case where the amount of toner stored in the toner cartridge becomes low, the toner cartridge is replaced.

EXAMPLES

Hereinafter, the exemplary embodiment will be more specifically described with reference to Examples and Comparative Examples; however, the exemplary embodiment is not limited thereto. Note that, "part(s)" and "%" indicating the amount are based on weight unless otherwise noted.

[Synthesis of Polyester Resin]

80 mol parts of polyoxypropylene (2,2)-2,2-bis(4-hydroxyphenyl)propane and 10 mol parts of ethylene glycol, 10 mol parts of cyclohexanediol, 80 mol parts of terephthalic acid, 10 mol parts of isophthalic acid, and 10 mol parts of n-dodecenyl succinic acid are added in a reaction vessel provided with a stirrer, a thermometer, a condenser, and a nitrogen gas introduction tube, and the inside of the reaction vessel is replaced with a dry nitrogen gas. Then, as a catalyst, 0.25 parts by weight of titanium tetrabutoxide is added to 100 parts by, weight of the monomer component. After a stirring reaction at 170° C. for 3 hours under a nitrogen gas stream, the temperature is further raised to 210° C. over 1 hour, the inside of the reaction vessel is reduced to 3 kPa, and a stirring reaction under reduced pressure is performed for 13 hours to obtain a polyester resin. When the glass transition temperature of the obtained resin is measured using a differential scanning calorimeter (DSC), the glass transition temperature is 58° C.

[Preparation of Polyester Resin Particle Dispersion]

Polyester resin above: 100 parts by weight
Ethyl acetate: 70 parts by weight
Isopropyl alcohol: 15 parts by weight A mixed solvent of the above ethyl acetate and the above isopropyl alcohol is added to a jacketed stainless steel vessel, and the polyester resin is slowly added to the vessel and completely dissolved while stirring to obtain an oil phase. A 10 by weight ammonia aqueous solution is slowly added dropwise to the stirred oil phase with a pump so as to have a total of 3 parts by weight, and 230 parts by weight of ion exchanged water is slowly added dropwise at a rate of 10 L/min and emulsified in phase. Then, vacuum distillation is carried out to obtain a polyester resin particle dispersion (solid content concentration: 40% by weight). The solid content concentration is measured using a moisture content meter MA35 (manufactured by Sartorius Mechatronics Japan Co., Ltd.). The same applies to the measurement of the solid content concentration of each of the following samples.

The volume average particle diameter (D50v) of the polyester resin particles in the obtained polyester resin particle dispersion is 180 nm. The volume average particle diameter of the polyester resin particles is measured using a laser diffraction type particle size distribution measuring device (LA-700: manufactured by HORIBA, Ltd.). As a measurement method, the sample in a state of being a dispersion is adjusted to have a solid content of about 2 g, and ion exchanged water is added thereto to make about 40 mL, and the mixture is added to a cell to satisfy appropriate concentration, held for 2 minutes, and measured when the concentration in the cell becomes almost stable. The volume average particle diameter for each obtained particle diameter range (channel) is accumulated from the smaller volume average particle diameter side, and the volume average particle diameter at the cumulative 50% is defined as the volume average particle diameter (D50v).

[Preparation of Release Agent Particle Dispersion]

Paraffin wax (manufactured by Nippon Seiro Co., Ltd., FNP92, endothermic peak onset 81° C.): 45 parts
Anionic surfactant (manufactured by DKS Co. Ltd., Neogen RK): 5 parts
Ion exchanged water: 200 parts The components are mixed, heated to 95° C., and dispersed using a homogenizer (Ultratarax T50 manufactured by IKA). Then, the mixture is dispersed with a Manton-Gaulin high pressure homogenizer (Gaulin Corporation) to prepare a release agent particle dispersion (solid content concentration: 20%) in which the release agent is dispersed. The volume average particle diameter of the release agent particles is 0.19 μm.

[Preparation of Coloring Agent Particle Dispersion]

Cyan pigment (manufactured by Dainichiseika Kogyo Co., Ltd., Pigment Blue 15:3 (copper phthalocyanine)): 98 parts
Anionic surfactant (manufactured by DKS Co, Ltd., Neogen R): 2 parts
Ion exchanged water: 400 parts The components are mixed and dissolved, and dispersed with a homogenizer (IKA Ultratarax) for 10 minutes to obtain a coloring agent particle dispersion having a central particle diameter of 0.16 μm and a solid content of 20%.

Example 1

[Preparation of Toner]

Polyester resin particle dispersion: 100 parts by weight

Coloring agent particle dispersion: 10 parts by weight

Release agent particle dispersion: 9 parts by weight

Ion exchanged water: 200 parts by weight

DEMOL SN-B aqueous solution (formalin condensate sodium sulfonic acid salt (polymer dispersant), manufactured by Kao Corporation, adjusted to a solid content of 10%): 1.3 parts by weight The raw materials are added to a tank having a jacket capable of heating and cooling, and 3 parts of a 0.3 M (=mol/L) nitric acid aqueous solution is added thereto to adjust a pH to 3.0. Next. 50 parts of a 10% aqueous solution of aluminum sulfate is dropped as an aggregating agent while circulating through a disperser (Cavitron manufactured by Pacific Machinery & Engineering Co., Ltd.) installed outside a stirring tank, and the mixture is mixed and dispersed, and then the mixture is heated at a jacket temperature of 50° C. while stirring with a stirring blade. Thereafter, for coating the aggregated particles, a mixture of 25 parts of the polyester resin dispersion and 10 parts of the ion exchanged water is added to a resin particle dispersion for coating which is prepared in advance to have pH of 3.0, and the mixture is held for 10 minutes. Then, in order to stop the growth of the coated aggregated particles (adhered particles), a 1 M (=mol/L) sodium hydroxide aqueous solution is added to control the pH of the raw material mixture to 8.0. Then, in order to coalesce the aggregated particles, the temperature is raised to 96° C. at a heating rate of 1° C./min; and after reaching 90° C., the temperature is maintained for 4 hours. Then, cooling is performed until the temperature reaches 40° C. to obtain toner slurry.

The particle size distribution is measured with a Coulter Multisizer 11 (aperture diameter: 50 μm, manufactured by Coulter). The volume average particle diameter is 6.0 μm, and a proportion of particles of 10 μm or more is 0.4% by volume.

Furthermore, after cleaning and drying the toner slurry to obtain toner particles, the charging property to be described later is evaluated. As a result, the charge amount in high temperature and high humidity (28° C./85% RH) is 38 μC/g.

Example 2

[Preparation of Toner]

Polyester resin particle dispersion: 100 parts by weight

Coloring agent particle dispersion: 10 parts by weight

Release agent particle dispersion: 9 parts by weight

Ion exchanged water: 200 parts by weight

On the other hand, a toner slurry is prepared in the same manner as in Example 1 except that 5.2 parts by weight of the DEMOL SN-B aqueous solution (solid content 10%) is added.

The particle size distribution is measured with a Coulter Multisizer II (aperture diameter: 50 μm, manufactured by Coulter). The volume average particle diameter is 5.9 μm, and a proportion of particles of 10 μm or more is 0.3% by volume.

Furthermore, after cleaning and drying the toner slurry to obtain toner particles, the charging property to be described later is evaluated. As a result, the charge amount in high temperature and high humidity (28° C./85% RH) is 29 μC/g.

Example 3

The toner slurry is prepared in the same manner as in Example 1 except that the DEMOL SN-B aqueous solution is changed to DEMOL SC-30 aqueous solution (formalin condensate sodium sulfonic acid salt (polymer dispersant), manufactured by Kao Corporation, adjusted to a solid content of 10%).

The particle size distribution is measured with a Coulter Multisizer II (aperture diameter: 50 μm, manufactured by Coulter). The volume average particle diameter is 5.9 μm, and a proportion of particles of 10 μm or more is 0.4% by volume.

Furthermore, after cleaning and drying the toner slurry to obtain toner particles, the charging property to be described later is evaluated. As a result, the charge amount in high temperature and high humidity (28° C./85% RH) is 37 μC/g.

Example 4

The toner slurry is prepared in the same manner as in Example 2 except that the DEMOL SN-B aqueous solution is changed to DEMOL SC-30 aqueous solution (formalin condensate sodium sulfonic acid salt (polymer dispersant), manufactured by Kao Corporation, adjusted to a solid content of 10%).

The particle size distribution is treasured with a Coulter Multisizer II (aperture diameter: 50 μm, manufactured by Coulter). The volume average particle diameter is 5.9 μm, and a proportion of particles of 10 μm or more is 0.3% by volume.

Furthermore, after cleaning and drying the toner slurry to obtain toner particles, the charging property to be described later is evaluated. As a result, the charge amount in high temperature and high humidity (28° C./85% RH) is 28 μC/g.

Example 5

The toner slurry s prepared in the same manner as in Example 1 except that DEMOL SN-B aqueous solution is changed to DEMOL EP aqueous solution (sodium salt of α-olefin-maleic acid copolymer (polymer dispersant), manufactured by Kao Corporation, adjusted to solid content of 10%).

The particle size distribution is measured with a Coulter Multisizer II (aperture diameter: 50 μm, manufactured by Coulter). The volume average particle diameter is 6.0 μm, and a proportion of particles of 10 μm or more is 0.7% by volume.

Furthermore, after cleaning and drying the toner slurry to obtain toner particles, the charging property to be described later is evaluated. As a result, the charge amount in high temperature and high humidity (28° C./85% RH) is 39 μC/g.

Example 6

The toner slurry is prepared in the same manner as in Example 1 except that DEMOL SN-B aqueous solution is changed to DKS Discoat aqueous solution (ammonium salt of styrene-maleic acid copolymer (polymer dispersant), manufactured by DKS Co., Ltd., adjusted to solid content of 10%), The particle size distribution is measured with a Coulter Multisizer II (aperture diameter: 50 μm, manufactured by Coulter). The volume average particle diameter is 5.9 μm, and a proportion of particles of 10 μm or more is 0.8% by volume.

Furthermore, after cleaning and drying the toner slurry to obtain toner particles, the charging property to be described later is evaluated. As a result, the charge amount in high temperature and high humidity (28° C./85% RH) is 37 μC/g.

Example 7

The toner slurry is prepared in the same manner as in Example 1 except that in the preparation of the release agent particle dispersion, the release agent (manufactured by Nippon Seiro Co., Ltd., FNP92) is changed to the release agent (manufactured by Nippon Seiwa Co., Ltd., HNP9).

The particle size distribution is measured with a Coulter Multisizer II (aperture diameter: 50 μm, manufactured by Coulter). The volume average particle diameter is 5.9 μm, and a proportion of particles of 10 μm or more is 0.8% by volume.

Furthermore, after cleaning and drying the toner slurry to obtain toner particles, the charging property to be described later is evaluated. As a result, the charge amount in high temperature and high humidity (28° C./8:5% RH) is 33 μC/g.

Example 8

[Preparation of Toner]

Polyester resin particle dispersion: 100 parts by weight
Coloring agent particle dispersion: 10 parts by weight
Release agent particle dispersion: 9 parts by weight
Ion exchanged water: 200 parts by weight The raw materials are added to a tank having a jacket capable of heating and cooling, and 3 parts of a 0.3 M mol/L) nitric acid aqueous solution is added thereto to adjust a pH to 3.0. Next, 50 parts of a 10% aqueous solution of aluminum sulfate is dropped as an aggregating agent while circulating through a disperser (Cavitron manufactured by Pacific Machinery & Engineering Co., Ltd.) installed outside a stirring tank, and the mixture is mixed and dispersed. Then, 1.3 parts by weight of DEMOL SN-B aqueous solution (formalin condensate sodium sulfonic acid salt (polymer dispersant), manufactured by Kao Corporation, adjusted to a solid content of 10%) is added thereto, and the mixture is heated at a jacket temperature of 50° C. while stirring with a stirring blade. Thereafter, for coating the aggregated particles, a mixture of 25 parts of the polyester resin dispersion and 10 parts of the ion exchanged water is added to a resin particle dispersion for coating which is prepared in advance to have pH of 3.0, and the mixture is held for 10 minutes. Then, in order to stop the growth of the coated aggregated particles (adhered particles), a 1 M (=mol/L) sodium hydroxide aqueous solution is added to control the pH of the raw material mixture to 8.0. Then, in order to coalesce the aggregated particles, the temperature is raised to 96° C. at a heating rate of 1° C./min, and after reaching 90° C., the temperature is maintained for 4 hours. Then, cooling is performed until the temperature reaches 40° C. to obtain toner slurry.

The particle size distribution is measured with a Coulter Multisizer II (aperture diameter: 50 μm, manufactured by Coulter). The volume average particle diameter is 6.0 μm, and a proportion of particles of 10 μm or more is 0.6% by volume.

Furthermore, after cleaning and drying the toner slurry to obtain toner particles, the charging property to be described later is evaluated. As a result, the charge amount in high temperature and high humidity (28° C./85% RH) is 39 μC/g.

Example 9

The toner slurry is prepared in the same manner as in Example 1 except that in the preparation of toner, DEMOL SN-B is added without making into an aqueous solution.

The particle size distribution is measured with a Coulter Multisizer II (aperture diameter: 50 μm, manufactured by Coulter). The volume average particle diameter is 5.9 μm, and a proportion of particles of 10 μm or more is 0.7% by volume.

Furthermore, after cleaning and drying the toner slurry to obtain toner particles, the charging property to be described later is evaluated. As a result, the charge amount in high temperature and high humidity (28° C./85% RH) is 37 μC/g.

Comparative Example 1

[Preparation of Toner]

Polyester resin particle dispersion: 100 parts by weight
Coloring agent particle dispersion: 10 parts by weight
Release agent particle dispersion: 9 parts by weight
Ion exchanged water: 200 parts by weight On the other hand, the toner slurry is prepared in the same manner as in Example 1 except that the polymer dispersant is not added.

The particle size distribution is measured with a Coulter Multisizer 11 (aperture diameter: 50 μm, manufactured by Coulter). The volume average particle diameter is 5.9 μm, and a proportion of particles of 10 μm or more is 2.1% by volume.

Furthermore, after cleaning and drying the toner slurry to obtain toner particles, the charging property to be described later is evaluated. As a result, the charge amount in high temperature and high humidity (28° C./85% RH) is 30 μC/g.

Comparative Example 2

[Preparation of Toner]

Polyester resin particle dispersion: 100 parts by weight
Coloring agent particle dispersion: 10 parts by weight
Release agent particle dispersion: 9 parts by weight
Ion exchanged water: 200 parts by weight On the other hand, a toner slurry is prepared in the same manner as in Example 1 except that 66 parts by weight of the DEMOL SN-B aqueous solution (solid content 10%) is added.

The particle size distribution is measured with a Coulter Multisizer II (aperture diameter: 50 μm, manufactured by Coulter). The volume average particle diameter is 5.9 μm, and a proportion of particles of 10 μm or more is 0.2% by volume.

Furthermore, after cleaning and drying the toner slurry to obtain toner particles, the charging property to be described later is evaluated. As a result, the charge amount in high temperature and high humidity (28° C./85% RH) is 12 μC/g.

Comparative Example 3

Polyester resin particle dispersion: 100 parts by weight
Coloring agent particle dispersion: 10 parts by weight
Release agent particle dispersion: 9 parts by weight
Ion exchanged water: 200 parts by weight The raw materials are added to a tank having a jacket capable of heating and cooling, and 3 parts of a 0.3 M nitric acid aqueous solution is added thereto to adjust a pH to 3.0. Next, 50 parts of a 10% aqueous solution of aluminum sulfate is dropped as an aggregating agent while circulating through a disperser (Cavitron manufactured by Pacific Machinery Engineering Co., Ltd.) installed outside a stirring tank, and the mixture is mixed and dispersed, and then the mixture is heated at a jacket temperature of 50° C. while stirring with a stirring blade. Thereafter, for coating the aggregated particles, a mixture of 25 parts of the polyester resin dispersion and 10 parts of the ion exchanged water is added to a resin particle dispersion for coating which is prepared in advance to have pH of 3.0, and the mixture is held for 10 minutes. Then, in order to stop the growth of the coated aggregated particles (adhered particles), a 1 M sodium hydroxide aqueous solution is added to control the pH of the raw material mixture to 8.0. Then, after 3 parts by weight of DEMOL SN-B aqueous solution (solid content 10%) is added, in order to coalesce the aggregated particles, the temperature is raised to 96° C. at a heating rate of 1° C./min, and after reaching 90° C., the temperature is maintained for 4 hours. Then, cooling is performed until the temperature reaches 40° C. to obtain toner slurry.

The particle size distribution is measured with a Coulter Multisizer II (aperture diameter: 50 μm, manufactured by Coulter). The volume average particle diameter is 5.9 μm, and a proportion of particles of 10 μm or more is 1.4% by volume.

Furthermore, after cleaning and drying the toner slurry to obtain toner particles, the charging property to be described later is evaluated. As a result, the charge amount in high temperature and high humidity (28° C./85% RH) is 20 μC/g.

Comparative Example 4

The toner slurry is prepared in the same manner as in Comparative Example 2 except that the DEMOL SN-B aqueous solution is changed to DEMOL SC-30 aqueous solution (formalin condensate sodium sulfonic acid salt (polymer dispersant), manufactured by Kao Corporation, adjusted to a solid content of 10%).

The particle size distribution is measured with a Coulter Multisizer II (aperture diameter: 50 μm, manufactured by Coulter). The volume average particle diameter is 6.0 μm, and a proportion of particles of 10 μm or more is 0.2% by volume.

Furthermore, after cleaning and drying the toner slurry to obtain toner particles, the charging property to be described later is evaluated. As a result, the charge amount in high temperature and high humidity (28° C./85% RH) is 11 μC/g.

Comparative Example 5

The toner slurry is prepared in the same manner as in Comparative Example 3 except that the DEMOL SN-B aqueous solution is changed to DEMOL SN-B aqueous solution (formalin condensate sodium sulfonic acid salt (polymer dispersant), manufactured by Kao Corporation, adjusted to a solid content of 10%).

The particle size distribution is measured with a Coulter Multisizer II (aperture diameter: 50 μm, manufactured by Coulter). The volume average particle diameter is 6.0 μm, and a proportion of particles of 10 μm or more is 1.4% by volume.

Furthermore, after cleaning and drying the toner slurry to obtain toner particles, the charging property to be described later is evaluated. As a result, the charge amount in high temperature and high humidity (28° C./85% RH) is 22 μC/g.

Comparative Example 6

The toner slurry is prepared in the same manner as in Comparative Example 2 except that the DEMOL SN-B aqueous solution is changed to Neogen R aqueous solution (sodium alkylbenzene sulfonic acid salt (surfactant), manufactured by DKS Co., Ltd.).

The particle size distribution is measured with a Coulter Multisizer II (aperture diameter: 50 μm, manufactured by Coulter). The volume average particle diameter is 5.9 μm, and a proportion of particles of 10 μm or more is 1.1% by volume.

Furthermore, after cleaning and drying the toner slurry to obtain toner particles, the charging property to be described later is evaluated. As a result, the charge amount in high temperature and high humidity (28° C./85% RH) is 12 μC/g.

<Evaluation of Coarse Powder Prevention Property>

Coulter Multisizer Type II (manufactured by Beckman Coulter, Inc.) is used as a measuring device and ISOTON-II (manufactured by Beckman Coulter, Inc.) is used as the electrolytic solution. As a measurement method, 0.5 mg of a measurement sample is added to 2 mL of a 5% aqueous solution of a surfactant (sodium dodecylbenzene sulfonate) as a dispersant, the mixture is added to 100 mL of the electrolytic solution, and a turbid electrolyte in which the measurement sample is suspended is prepared. The electrolytic solution in which the measurement sample is suspended is dispersed for about 1 minute by an ultrasonic disperser. Then, using the Coulter Multisizer type II, the particle size distribution of the particles having a particle diameter of from 2.0 μm to 60 μm is measured using an aperture having an aperture diameter of 50 μm. The number of particles measured is 50,000. For the measured particle size distribution, a cumulative distribution is drawn from the small diameter side on the volume basis with respect to the divided particle size range (channel), and the particle diameter at a cumulative 50% is defined as D50v.

A proportion of coarse powder after completion of coalescence is evaluated according to the following criteria. The practically permissible range is A or B.

A: A proportion of the particle volume of 10 μm or more is less than 0.5% by volume B: A proportion of the particle volume of 10 μm or more is 0.5% by volume or more and less than 1.0% by volume C: A proportion of the particle volume of 10 μm or more is 1.0% by volume or more and less than 2.0% by volume D: A proportion of the particle volume of 10 μm or more is 2.0% by volume or more <Evaluation of Charging Property in High-Temperature and High-Humidity Environment>

1 Part of colloidal silica (manufactured by Nippon Aerosil Co., Ltd., R972) is externally added to 100 parts of the obtained toner particles and mixed using a Henschel mixer to obtain an electrostatic charge image developing toner.

100 parts of ferrite particles (manufactured by Powdertech Co., Ltd., average particle diameter 50 μm) and 1 part of polymethylmethacrylate resin (manufactured by Mitsubishi Rayon Co., Ltd., weight average molecular weight 95,000) are put into a pressurized kneader together with 500 parts of toluene, and mixed at room temperature (25° C.) for 15 minutes. Then, the temperature is raised to 70° C. while mixing under reduced pressure and toluene is distilled off. The mixture is cooled, and the particles are separated using a 105 μm sieve to prepare a ferrite carrier (resin-coated ferrite carrier).

This ferrite carrier and the electrostatic charge image developing toner are mixed to prepare a two-component electrostatic charge image developer having a toner concentration of 7% by weight.

The obtained electrostatic charge image developer is filled in a developing device and seasoned in an environment of high temperature and high humidity (28° C./85% RH) for 24 hours. After that, a developing machine is idled for 3 minutes in the same environment, and the charge amount of the developer is measured by using a blow-off charge amount measuring machine (Toshiba Corporation, TB200) under high temperature and high humidity charge amount).

The charge amount is evaluated according to the following criteria. The practically permissible range is A or B.

A: 35 μC/g or more
B: 25 μC/g or more and less than 35 μC/g
C: 15 μC/g or more and less than 25 μC/g
D: less than 15 μC/g Table 1 summarizes the evaluation results.

TABLE 1

| | Chemical structure of polymer dispersant | Product name and manufacturer of polymer dispersant | Timing of addition of polymer dispersant | Additive amount of polymer dispersant | Coarse powder prevention property | Charging property in high-temperature and high-humidity environment |
|---|---|---|---|---|---|---|
| Example 1 | Formalin condensate sulfonate | DEMOL SN-B manufactured by Kao Corporation | Before aggregating step | 0.3% by weight | A | A |
| Example 2 | Formalin condensate sulfonate | DEMOL SN-B manufactured by Kao Corporation | Before aggregating step | 1.2% by weight | A | B |
| Example 3 | Formalin condensate sulfonate | DEMOL SC-30 manufactured by Kao Corporation | Before aggregating step | 0.3% by weight | A | A |
| Example 4 | Formalin condensate sulfonate | DEMOL SC-30 manufactured by Kao Corporation | Before aggregating step | 1.2% by weight | A | B |
| Example 5 | Sodium salt of α-olefin-maleic acid copolymer | DEMOL EP manufactured by Kao Corporation | Before aggregating step | 0.3% by weight | B | A |
| Example 6 | Ammonium salt of styrene-maleic acid copolymer | DKS Discoat N-10 DKS Co. Ltd. | Before aggregating step | 0.3% by weight | B | A |
| Example 7 | Formalin condensate sulfonate | DEMOL SN-B manufactured by Kao Corporation | Before aggregating step | 0.3% by weight | B | B |
| Example 8 | Formalin condensate sulfonate | DEMOL SN-B manufactured by Kao Corporation | Before aggregating step | 0.3% by weight | B | A |
| Example 9 | Formalin condensate sulfonate | DEMOL SN-B manufactured by Kao Corporation, added as solid | Before aggregating step | 0.3% by weight | B | A |
| Comparative Example 1 | Polymer dispersant is not added | | | | D | B |
| Comparative Example 2 | Formalin condensate sulfonate | DEMOL SN-B manufactured by Kao Corporation | Before aggregating step | 1.5% by weight | A | D |
| Comparative Example 3 | Formalin condensate sulfonate | DEMOL SN-B manufactured by Kao Corporation | Coalescing step | 0.7% by weight | C | C |
| Comparative Example 4 | Formalin condensate sulfonate | DEMOL SC-30 manufactured by Kao Corporation | Before aggregating step | 1.5% by weight | A | D |
| Comparative Example 5 | Formalin condensate sulfonate | DEMOL SC-30 manufactured by Kao Corporation | Coalescing step | 0.7% by weight | C | C |
| Comparative Example 6 | Sodium alkylbenzene sulfonate | Neogen R DKS Co. Ltd. | Before aggregating step | 0.4% by weight | C | D |

From the results, it is found that in the examples, an electrostatic charge image developing toner which has an excellent charging property in a high-temperature and high-humidity environment and is less likely to generate a coarse powder during preparing as compared with the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A preparing method of an electrostatic charge image developing toner, the method comprising:

aggregating at least binder resin particles and release agent particles contained in a dispersion to form aggregated particles;

heating and coalescing the aggregated particles to form coalesced particles; and filtering and cleaning the coalesced particles to obtain toner particles, wherein before the aggregating or during the aggregating, a polymer dispersant is added to the dispersion in an amount of 0.01% by weight or more and 1.3% by weight or less with respect to a total weight of the obtained toner particles, the polymer dispersant is added to the dispersion as an aqueous solution comprising 1% by weight to 40% by weight of the polymer dispersant, the aqueous solution comprises 5% by weight or more and 40% by weight or less of the polymer dispersant, and the polymer dispersant is at least one compound selected from the group consisting of a formalin condensate sulfonate, a salt of an α-olefin-maleic acid copolymer, and a salt of a styrene-maleic acid copolymer.

2. The preparing method of an electrostatic charge image developing toner according to claim 1, wherein the polymer dispersant is the formalin condensate sulfonate.

3. The preparing method of an electrostatic charge image developing toner according to claim 1, wherein before the aggregating or during the aggregating, the polymer dispersant is added to the dispersion in an amount of 0.03% by weight or more and 1.3% by weight or less with respect to the total weight of the obtained toner particles.

4. The preparing method of an electrostatic charge image developing toner according to claim 2, wherein before the aggregating or during the aggregating, the polymer dispersant is added to the dispersion in an amount of 0.03% by weight or more and 1.3% by weight or less with respect to the total weight of the obtained toner particles.

5. The preparing method of an electrostatic charge image developing toner according to claim 3, wherein before the aggregating or during the aggregating, the polymer dispersant is added to the dispersion in an amount of 0.05% by weight or more and 1.0% by weight or less with respect to the total weight of the obtained toner particles.

6. The preparing method of an electrostatic charge image developing toner according to claim 4, wherein before the aggregating or during the aggregating, the polymer dispersant is added to the dispersion in an amount of 0.05% by weight or more and 1.0% by weight or less with respect to the total weight of the obtained toner particles.

7. The preparing method of an electrostatic charge image developing toner according to claim 1, wherein in the aggregating, a solid content concentration of the dispersion is 11% by weight or higher and 20% by weight or lower.

8. The preparing method of an electrostatic charge image developing toner according to claim 2, wherein in the aggregating, a solid content concentration of the dispersion is 11% by weight or higher and 20% by weight or lower.

9. The preparing method of an electrostatic charge image developing toner according to claim 3, wherein in the aggregating, a solid content concentration of the dispersion is 11% by weight or higher and 20% by weight or lower.

10. The preparing method of an electrostatic charge image developing toner according to claim 4, wherein in the aggregating, a solid content concentration of the dispersion is 11% by weight or higher and 20% by weight or lower.

11. The preparing method of an electrostatic charge image developing toner according to claim 5, wherein in the aggregating, a solid content concentration of the dispersion is 11% by weight or higher and 20% by weight or lower.

12. The preparing method of an electrostatic charge image developing toner according to claim 1, wherein the aqueous solution is added before the aggregating or during the aggregating.

13. The preparing method of an electrostatic charge image developing toner according to claim 1, wherein the polymer dispersant is a salt of an α-olefin-maleic acid copolymer.

* * * * *